Jan. 11, 1927.

N. W. RAPHAEL

MARKING AND MEASURING DEVICE

Filed August 20, 1925

1,613,676

WITNESSES

INVENTOR
Nathaniel W. Raphael.
BY
ATTORNEYS

Patented Jan. 11, 1927.

1,613,676

UNITED STATES PATENT OFFICE.

NATHANIEL W. RAPHAEL, OF SOUTH ORANGE, NEW JERSEY.

MARKING AND MEASURING DEVICE.

Application filed August 20, 1925. Serial No. 51,434.

This invention relates to marking and measuring devices, and is especially adapted for use by estimators.

An estimator who is called upon to determine the costs involved in erecting walls as represented by lines in a set of floor plans of a building, has to mark out the lines and measure the lines marked out. Usually all lines of the plans are not marked out and measured and it happens not infrequently that certain lines which have been marked out were not measured and as a consequence there is a difference between the costs estimated and the actual cost involved in the erecting of the walls. Errors of this kind frequently occur and the procedure of arriving at accurate costs now in practice is slow and tedious.

The principal object of the present invention is the production of a device consisting of instrumentalities by virtue of which marking and measuring operations may be carried out simultaneously to the end that accurate estimations may be made easily and expeditiously.

With the foregoing, other objects of the invention will appear from the embodiment of the invention which by way of example is described in the following specification and illustrated in the accompanying drawing, in which.

Figure 1:
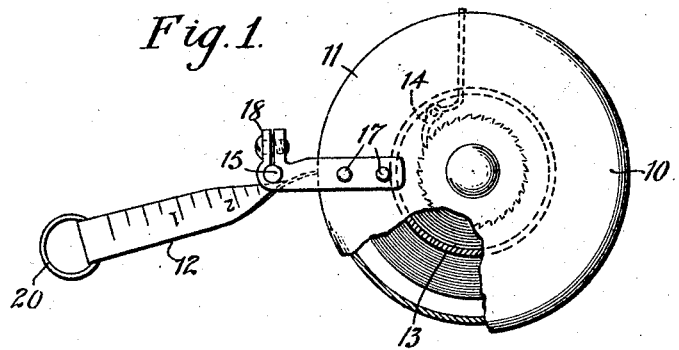
Figure 1 is a plan view of the marking and measuring device of the present invention with a portion of the tape measure casing being broken away and showing a portion of the measuring tape withdrawn.
Figure 2:
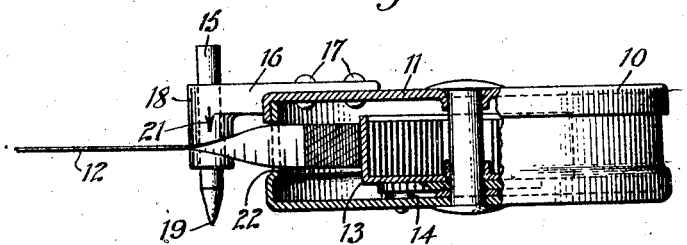
Figure 2 is a side elevation of the device with a portion of the tape measure casing broken away.

Broadly stated, the present invention contemplates the combination of an instrumentality in the form of a crayon and a tape measure of the flexible tape ratchet type as a second instrumentality. The two instrumentalities mentioned constitute the means by virtue of which the basic idea of the present invention is carried out, the same being the marking of straight lines representing parts of drawings or plans and the simultaneous measurement of the lines marked so that an individual at a glance may know the aggregate dimensions of the combined lengths of the lines marked, and with the assurance that all of the lines which have been marked have actually been measured.

In the drawing there is shown a tape measure 10 which may be of any preferred construction but which must essentially include a casing 11, measuring tape 12 which is capable of being withdrawn from the casing and returned thereinto to be wound upon a spool or holder 13, which is under the control of ratchet means 14 which releasably retains the tape against return movement when withdrawn regardless of the extent to which it is withdrawn. Inasmuch as the nature of the construction and operation of the parts just mentioned is well known a more detailed description will be omitted. A marker 15 in the nature of a crayon is employed, and the same is held by a holder 16 attached as at 17 to the casing 11. The crayon 15 is held by the clamp 18 forming a part of the holder 16. The marking point 19 of the crayon 15 is disposed slightly below the bottom face of the casing 11.

In carrying out the marking and measuring operations the loop 20 at the end of the tape 12 is taken hold of by the thumb and forefinger of the left hand, the casing is held in the right hand and is moved with the point 19 in contact with the line to be marked out. This action will result in a portion of the tape 12 being withdrawn from the casing 11 through the tape slit 21 in the casing. The means 14 prevents the return movement of the type. By repeating the operation just described more and more of the tape will be withdrawn as additional lines are marked out, the tape always being held against return movement. After the particular lines sought have been marked and measured the aggregate dimensions of the lines as to combined length may be ascertained at a glance since that measurement on the tape which occurs directly adjacent the pointer 22 on the clamp 18 will be the correct total length. By making the other necessary calculations the costs in dollars and cents may be made without mistake.

From the foregoing it will be apparent that marking and measuring of lines representing walls of blue prints or the like may be carried out simultaneously, easily and expeditiously.

I claim:

1. The combination of a marker with the casing of a tape measure, the measuring tape of which is capable of being withdrawn from the casing and returned thereinto, and means for releasably retaining the tape against return movement when withdrawn, said marker being attached to said casing adjacent the point at which the tape passes through the casing.

2. The combination of a marker with the casing of a tape measure, the measuring tape of which is capable of being withdrawn from the casing and returned thereinto, and means for releasably retaining the tape against return movement when withdrawn, said marker being attached to said casing adjacent the point at which the tape passes through the casing, the marker being arranged transversely, with its marking point lowermost, with respect to the disposition of the tape when withdrawn.

3. The combination of a colored crayon with the casing of a tape measure, the measuring tape of which is capable of being withdrawn from and returned to the casing through a slit therein, and means for releasably retaining the tape against return movement when withdrawn, the crayon being fixedly arranged on said casing in close proximity to said slit by a clamp secured to said casing.

NATHANIEL W. RAPHAEL.